United States Patent
Schieffelin (10) Patent No.: US 11,904,983 B2
(45) Date of Patent: Feb. 20, 2024

(54) ELECTRIC ASSIST VEHICLE WITH INTEGRATED SPEED CONTROL

(71) Applicant: CIVILIZED CYCLES INCORPORATED, Brooklyn, NY (US)

(72) Inventor: Zachary Schieffelin, Brooklyn, NY (US)

(73) Assignee: Civilized Cycles Incorporated, Brooklyn, NY (US)

( * ) Notice: Subject to any disclaimer, the term of this patent is extended or adjusted under 35 U.S.C. 154(b) by 336 days.

(21) Appl. No.: 17/474,853

(22) Filed: Sep. 14, 2021

(65) Prior Publication Data

US 2022/0411015 A1  Dec. 29, 2022

Related U.S. Application Data (60) Provisional application No. 63/215,386, filed on Jun. 25, 2021.

(51) Int. Cl.
| | |
|---|---|
| *B62M 6/50* | (2010.01) |
| *B62J 45/412* | (2020.01) |
| *B62K 25/04* | (2006.01) |
| *B62L 3/00* | (2006.01) |
| *B62K 5/027* | (2013.01) |
| *G01S 19/42* | (2010.01) |

(52) U.S. Cl.
CPC .............. *B62M 6/50* (2013.01); *B62J 45/412* (2020.02); *B62K 5/027* (2013.01); *B62K 25/04* (2013.01); *B62L 3/00* (2013.01); *G01S 19/42* (2013.01)

(58) Field of Classification Search
CPC ......... B62M 6/50; B62J 45/412; B62K 5/027; B62K 25/04; B62L 3/00; G01S 19/42
See application file for complete search history.

(56) References Cited

U.S. PATENT DOCUMENTS

| | | | |
|---|---|---|---|
| 9,857,252 B2 * | 1/2018 | Murugesan | G01L 3/10 |
| 10,604,210 B2 * | 3/2020 | Shahana | H02P 29/00 |
| 2015/0292934 A1 * | 10/2015 | Baumgaertner | G01G 19/02 |
| | | | 701/22 |
| 2016/0304157 A1 * | 10/2016 | Craven | B62M 6/50 |
| 2022/0332385 A1 * | 10/2022 | Lin | B62J 3/14 |
| 2023/0150608 A1 * | 5/2023 | Misgeld | B62M 6/60 |
| | | | 180/206.1 |

* cited by examiner

*Primary Examiner* — Tony H Winner
(74) *Attorney, Agent, or Firm* — Kolitch Romano Dascenzo Gates LLC (57) ABSTRACT

An electric assist vehicle is described, which may have a cargo area, a drivetrain including an external crankset and an electric motor, and a speed control system. The speed control system automatically limits the maximum operating speed of the vehicle based, at least in part, on a load mass (e.g., a gross weight) of the vehicle and/or the cargo area of the vehicle. Limiting the speed includes, for example, reducing the power of the electric motor and/or increasing a braking force on the vehicle.

20 Claims, 4 Drawing Sheets

ELECTRIC ASSIST VEHICLE WITH INTEGRATED SPEED CONTROL

CROSS-REFERENCES

The following applications and materials are incorporated herein, in their entireties, for all purposes: U.S. Provisional Patent Application Ser. No. 63/215,386, filed Jun. 25, 2021 and U.S. Pat. No. 10,486,767.

FIELD

This disclosure relates to systems and methods for electric assist vehicles. More specifically, the disclosed embodiments relate to speed control systems for use with electric assist vehicles.

INTRODUCTION

Electric assist vehicles, such as electric assist bicycles, tricycles, etc., are utilized for transportation and urban delivery throughout the world. As the weight of such vehicles increases, certain driving characteristics may become less safe, for example, the braking distance may be increased, the turning radius may be increased, etc. Accordingly, various braking systems may be employed by the rider to maintain a safe operating speed.

SUMMARY

The present disclosure provides systems, apparatuses, and methods relating to speed control of electric assist vehicles.

In some examples, an electric assist vehicle includes: a plurality of ground-contacting wheels rotatably coupled to a frame; a drivetrain operatively coupled to at least one of the ground-contacting wheels and configured to propel the vehicle, wherein the drivetrain is convertible between a human-powered mode and an electric assist mode; a sensor configured to determine a characteristic corresponding to a weight of the vehicle; and an electronic controller configured to maintain the vehicle below a maximum speed, wherein the maximum speed is based on the characteristic.

In some examples, a method of operating an electric assist vehicle includes: receiving, at a controller of an electric assist vehicle, a mass-related characteristic of the vehicle, wherein the vehicle includes: a plurality of ground-contacting wheels rotatably coupled to a frame and a drivetrain operatively coupled to at least one of the ground-contacting wheels and configured to propel the vehicle, wherein the drivetrain is convertible between a human-powered mode and an electric assist mode; automatically determining a maximum speed based on the mass-related characteristic of the electric vehicle; and using the controller, automatically limiting a current speed of the vehicle to no more than the maximum speed.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of an electric assist vehicle and corresponding onboard speed control system, as well as related methods, are described below and illustrated in the associated drawings. Unless otherwise specified, an electric assist vehicle in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, onboard speed control systems of the present disclosure are configured to be utilized with electric assist vehicles, such as electric assist bicycles. In some examples, onboard speed control systems of the present disclosure are configured to be utilized with electric assist cargo vehicles, such as electric assist cargo bicycles (e.g., electric assist cargo bicycles utilized for urban delivery systems). Examples of electric assist vehicles suitable for use with control systems of the present disclosure include those described in U.S. Pat. No. 10,486,767.

The electric assist vehicle includes at least one front wheel rotatably coupled to a frame/chassis, for example by a front fork assembly steerable by a handlebar. In some examples, the front fork assembly may include a front suspension system (e.g., a pneumatic shock absorber, a spring-based shock absorber, or other suitable suspension system). In some examples, the handlebar is coupled to a steering column configured to engage a steering linkage having two front wheels rotatably coupled thereon. In such examples, the electric assist vehicle may have a cargo area disposed between the two front wheels, e.g., above the steering linkage.

The electric assist vehicle further includes at least one rear wheel rotatably coupled to the frame, for example by a rear triangle (e.g., including a seat stay, a chain stay, etc.). In some examples, the rear triangle comprises one or more rear suspension system(s). In some examples, the electric assist vehicle may have two rear wheels rotatably coupled to a chassis and a cargo area may be disposed between the two rear wheels.

The electric assist vehicle further includes a crankset configured to provide manual power to a drivetrain. The crankset is supplementally or intermittently operable in tandem with an electric drive system, including one or more electric motors. The electric drive system may receive power from one or more batteries.

The electric assist vehicle may include one or more sensors configured to measure a load mass of the vehicle. In some examples, the measured load mass corresponds to an overall weight of the vehicle. In some examples, the load mass corresponds solely to a weight of the cargo area of the vehicle. In some examples, the one or more sensors are coupled to a portion of the front suspension system and/or the rear suspension system.

The electric assist vehicle includes an onboard speed control system. The speed control system is configured to automatically limit a top speed of the vehicle, and may be referred to as a governor. The speed control system is configured to utilize mass-related data, e.g., from the one or more sensors to determine a maximum allowable speed (e.g., based on local or regional regulations). The speed control system compares a current speed of the vehicle to the maximum allowable speed and, if necessary, limits the speed of the vehicle. This may be accomplished, for example by controlling a power output of the electric motor, applying a brake, and/or other suitable systems and methods.

Examples, Components, and Alternatives

The following sections describe selected aspects of illustrative electric assist vehicles as well as related systems and/or methods for speed control thereof. The examples in these sections are intended for illustration and should not be interpreted as limiting the scope of the present disclosure. Each section may include one or more distinct embodiments or examples, and/or contextual or related information, function, and/or structure.

A. Illustrative Electric Assist Vehicle

Figure 1:
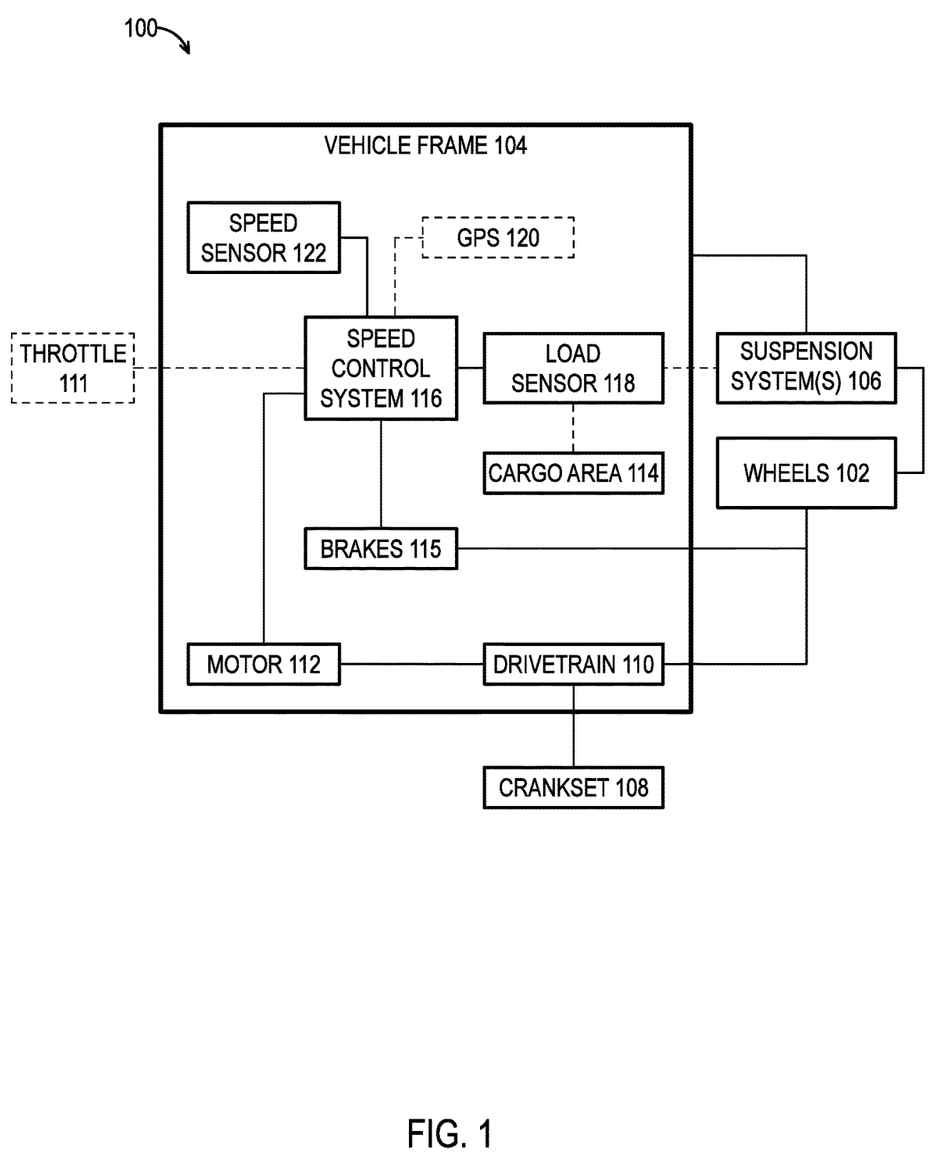
FIG. 1 is a schematic view of an electric assist vehicle in accordance with aspects of the present disclosure.

As shown in FIG. 1, this section describes an illustrative electric assist vehicle 100. Electric assist vehicle 100 is an example of the electric assist vehicle(s), described above.

Electric assist vehicle 100 includes wheels 102 comprising at least one front wheel rotatably coupled to a frame 104, e.g., by a front fork assembly. In some examples, the front fork assembly may include a front suspension system 106 (e.g., a pneumatic shock absorber, a spring-based shock absorber, or other suitable suspension system), thereby allowing the front wheel(s) of the electric assist vehicle to move independently of the frame through compression and expansion of the front suspension system. The front fork assembly is steerable by a handlebar.

Electric assist vehicle 100 further includes at least one rear wheel rotatably coupled to the frame, e.g., by a rear triangle (e.g., including a seat stay, a chain stay, etc.). In some examples, a first edge of the rear triangle comprises a rear suspension system 106 and a seat stay, and a second edge of the rear triangle comprises a chain stay pivotally connected to the frame. The first and second edges of the triangle may join at a vertex comprising a rear wheel mounting bracket. A similar rear triangle may be formed on each lateral side of the vehicle thereby allowing the rear wheel(s) of electric assist vehicle 100 to move independently of the frame through compression and expansion of the rear suspension system(s).

In some examples, electric assist vehicle 100 may be three-wheeled. For example, electric assist vehicle 100 may include two front wheels and one rear wheel (AKA a 2F1R three-wheeled vehicle). In another example, electric assist vehicle 100 may include one front wheel and two rear wheels (AKA a 1F2R three-wheeled vehicle).

Electric assist vehicle 100 further includes a crankset 108 configured to provide manual power to a drivetrain 110. Crankset 108 is supplementally and/or intermittently operable in tandem with an electric drive system including an electric motor 112. The electric drive system may receive power from one or more batteries. In some examples, the electronic assist vehicle 100 further includes a throttle 111. Throttle 111 is configured to be in electronic communication with a speed control system 116 (see further description below) to operatively control a power output of electric motor 112.

In some examples, electric assist vehicle 100 includes a cargo area 114. In some examples, the cargo area is disposed adjacent the rear wheel(s), such as the example depicted in FIG. 2. In some examples, the cargo area is disposed adjacent the front wheels. Further examples of cargo areas include: a platform disposed between the rider and the front and/or rear wheel(s) (AKA a "long john" type cargo area), a platform disposed above the rear wheel (AKA a "longtail" type cargo area), a trailer, caddy, or other pull-behind cargo area, or a combination of the aforementioned examples. Additionally, or alternatively, electric assist vehicle 100 may include a passenger area. For example, the vehicle may have an extended seat, a sidecar, and/or a rear passenger area (e.g., such as a rickshaw).

Electric assist vehicle 100 includes speed control system 116. The speed control system is configured to operate electronically operate the power output of motor 112 (e.g., in concert with crankset 108 and throttle 111). Furthermore, speed control system 116 is configured to limit the speed of vehicle 100, such that the vehicle does not surpass a predetermined maximum speed. The speed control system is configured to compare a current speed of the vehicle to the maximum speed and, if necessary, limit the speed, for example by controlling a power output of the electric motor, applying a braking force, and/or other suitable systems/methods.

Electric assist vehicle 100 includes one or more load sensors 118 configured to measure a load of the vehicle. The load may correspond to an overall gross weight of the vehicle or a gross weight of the cargo area. In some examples, load sensor 118 is coupled to a portion of suspension system(s) 106. In some examples, load sensor 118 is coupled to an axle of the vehicle.

In some examples, such as when the suspension system 106 comprises pneumatic shock absorbers, the load sensor measures a characteristic of the air pressure in the suspension system. The characteristic may include directly measuring the air pressure within the suspension system—for example, load sensor 118 may comprise one or more pressure gauges. The load mass may then be calculated and/or determined (e.g., through a look-up table) based on the measured air pressure in the suspension system.

In some examples, suspension system 106 is coupled to an air compressor and a controller, such that the controller is configured to automatically pump additional air from the air compressor into the suspension system to compensate for a sag in the suspension system under a heavy load. Accordingly, the amount of air added into the suspension system from an unloaded state to a loaded state corresponds to the load of the vehicle. The load mass may then be calculated and/or determined (e.g., through a look-up table) based on the added air pressure.

A failsafe mode may be employed if the air pressure drops below a specified threshold. For example, if the suspension system(s) fail, the maximum speed may be automatically assigned a rescue-mode value, e.g., a maximum speed lower than otherwise required.

Load sensor 118 may measure an average compression of the suspension system(s). For example, load sensor 118 may measure an average displacement of portions of the suspension system under a load from a known, unloaded position. A load mass may then be calculated and/or determined (e.g., through a look-up table) based on the measured displacement of the suspension system.

In some examples, such as when electric vehicle 100 does not include any suspension systems, load sensor 118 may comprise a strain gauge, such as an axial strain gauge, linear strain gauge, shear strain gauge, or other suitable strain gauge. The strain gauge may be disposed in the frame/chassis of the vehicle and/or adjacent one or more of wheels 102.

In some examples, the load may be inferred from a measured acceleration/deceleration rate (e.g., measured by an accelerometer), a measured power consumption of the electric motor, and/or measured by an external scale and electronically communicated to speed control system 116. In some examples, the load may be inferred and/or calculated by comparing a current draw on electric motor 112 to a current acceleration rate of the vehicle. For example, a heavily loaded vehicle may accelerate more slowly than a lightly loaded vehicle.

In certain jurisdictions, a maximum speed limit may be instated solely for vehicles having a weight above a specified threshold. Electric assist vehicle 100 may optionally include a GPS unit 120 configured to determine the current location (and therefore corresponding jurisdiction) of the vehicle and speed control system 116 may automatically update the maximum speed accordingly. In some examples, the maximum speed is manually set, for example by the rider, manufacturer, and/or other user.

A description of the operation of the speed control system is provided below, with respect to FIG. 4 and corresponding method 400.

Figure 2:
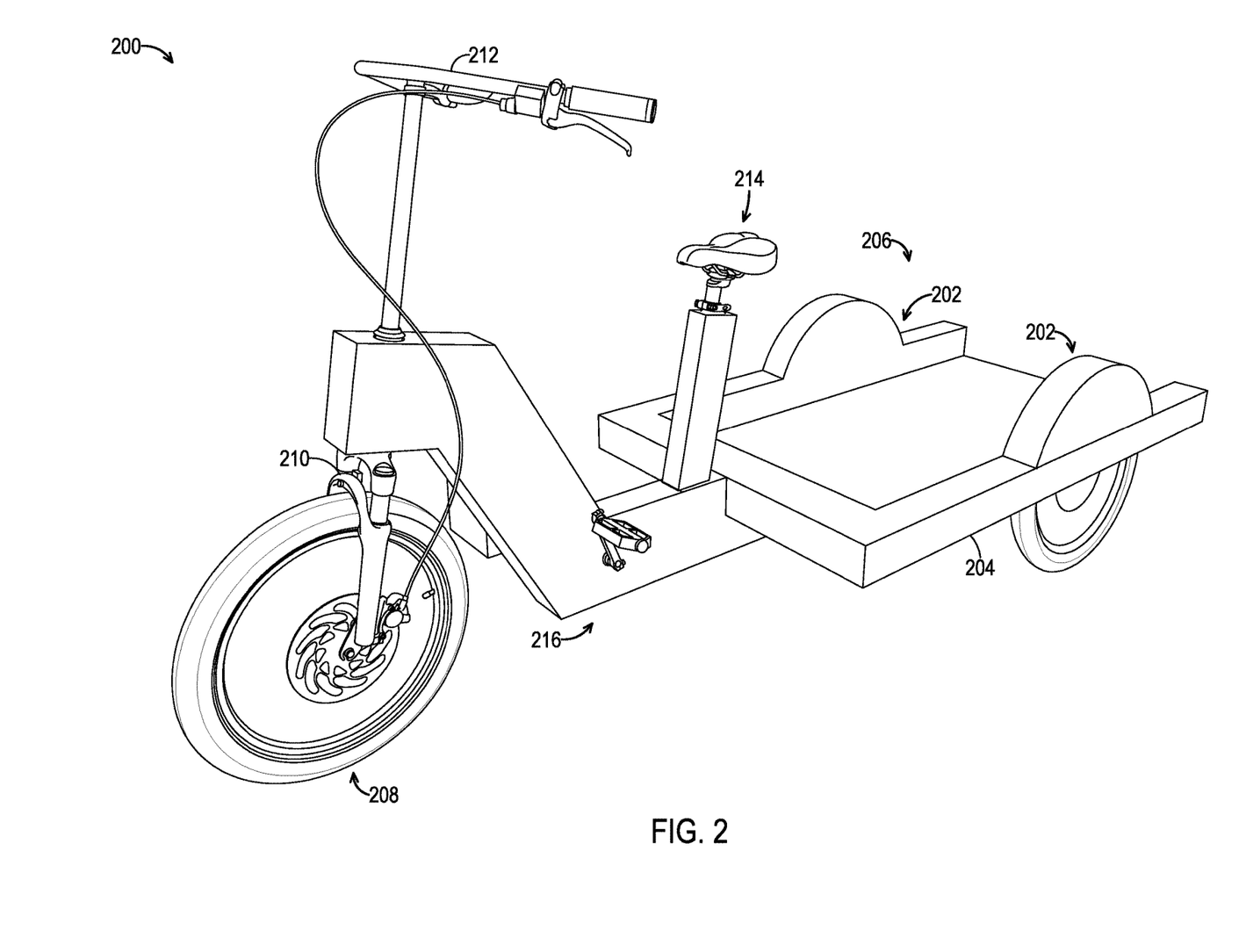
FIG. 2 is a front perspective view of an illustrative electric assist vehicle having a rear cargo area in accordance with aspects of the present disclosure.
Figure 3:
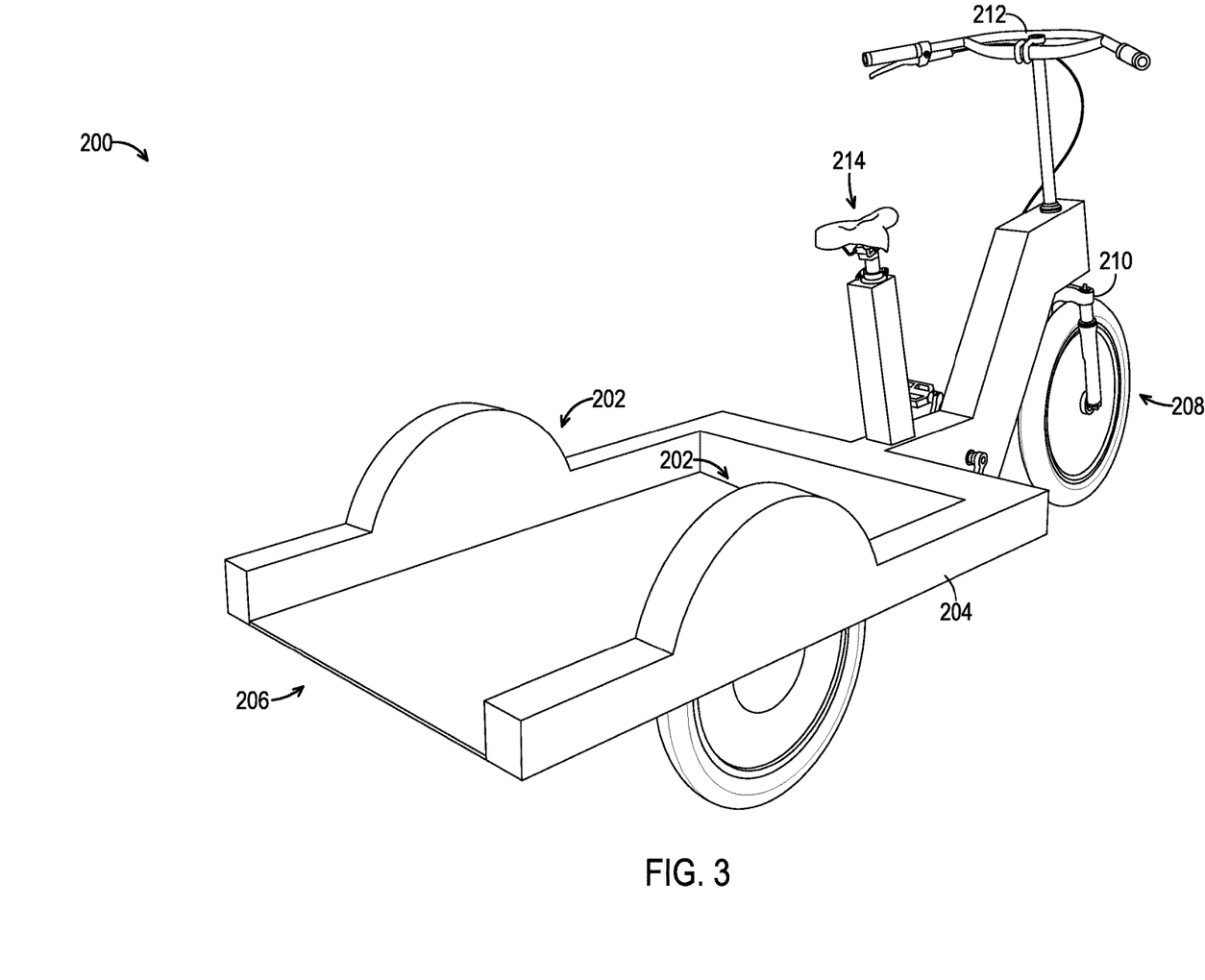
FIG. 3 is a rear perspective view of the illustrative electric assist vehicle of FIG. 2.

Turning to FIGS. 2, 3, electric vehicle 200 is shown. Vehicle 200 is an example of electric vehicle 100 having a rearward cargo area. In the example depicted in FIG. 2, vehicle 200 includes two rear wheels 202 rotatably coupled to chassis 204. Cargo area 206 is disposed on chassis 204, between rear wheels 202.

Front wheel 208 is rotatably coupled to chassis 204 by a front fork assembly including a front suspension system 210 (e.g., a pneumatic shock absorber, a spring-based shock absorber, or other suitable suspension system), thereby allowing the front wheel to move independently of the frame through compression and expansion of front suspension system 210. The front fork assembly is steerable by handlebar 212. A seat 214 is disposed on a seat tube rigidly attached to chassis 204. Handlebar 212 and seat 214 form a rider support portion of vehicle 200.

Electric assist vehicle 200 further includes a crankset 216 configured to provide manual power to a drivetrain 218. Crankset 216 is supplementally and/or intermittently operable in tandem with an electric drive system including an electric motor 220 (not shown), e.g., mounted within chassis 204.

As described above, with respect to electric vehicle 100, electric vehicle 200 includes a speed control system substantially similar to speed control system 116 configured to limit a maximum speed of the vehicle. The operation of the speed control system of vehicle 200 is described in more depth below, with respect to FIG. 4 and corresponding method 400.

B. Illustrative Method for Speed Control of an Electric Assist Vehicle

Figure 4:
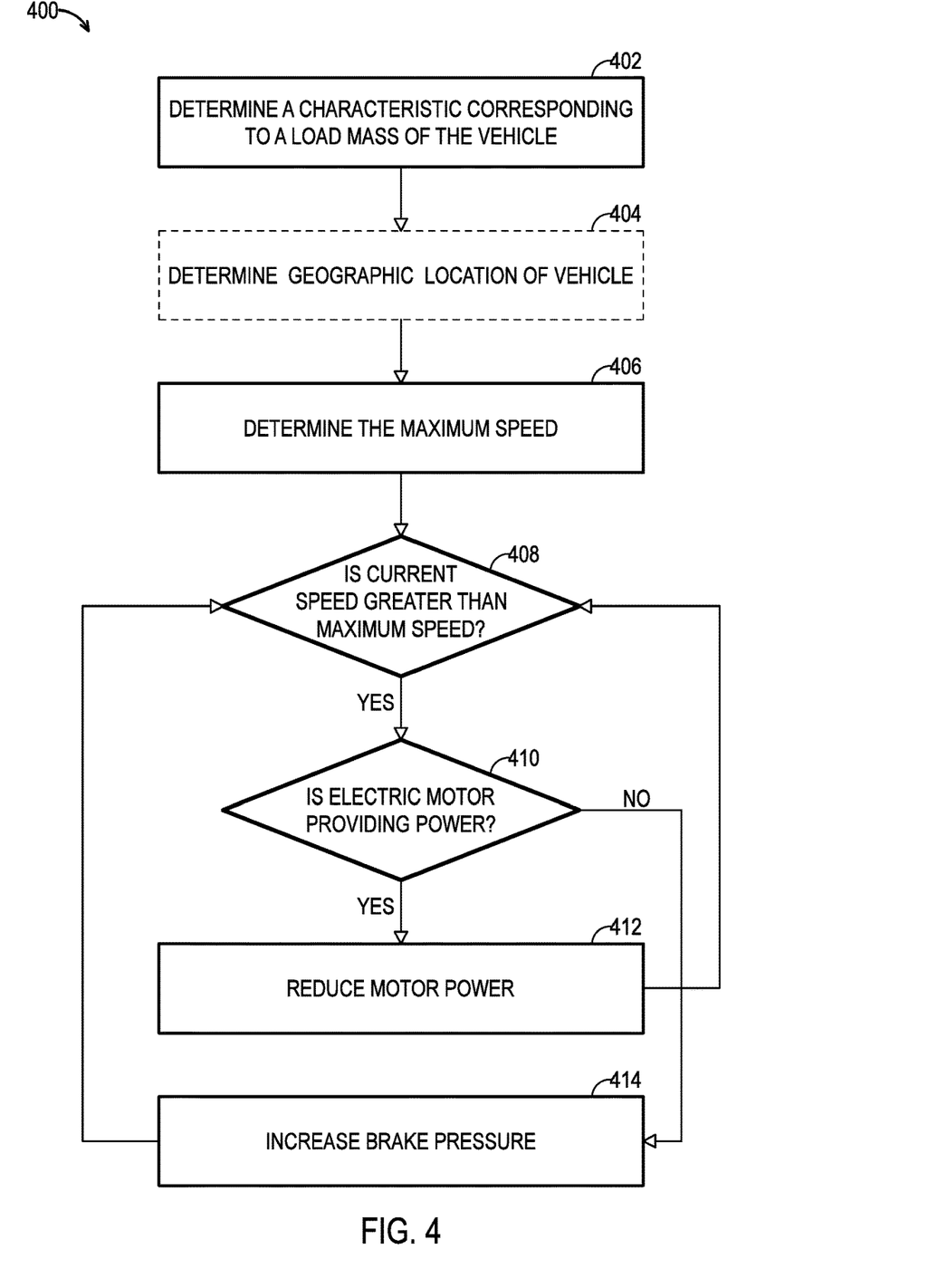
FIG. 4 is a flow chart depicting steps of an illustrative method for speed control of an electric assist vehicle according to aspects of the present teachings.

This section describes steps of an illustrative method 400 for controlling the speed of an electric vehicle, namely limiting the maximum speed; see FIG. 4. Aspects of the electric assist bicycle described above, for example electric vehicles 100, may be utilized in the method steps described below. Where appropriate, reference may be made to components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. Although various steps of method 400 are described below and depicted in FIG. 4, the steps need not necessarily all be performed, and in some cases may be performed simultaneously or in a different order than the order shown.

Step 402 of method 400 includes determining a load mass of the vehicle. As described above, in some examples, the load mass corresponds to a gross weight of the vehicle.

Optional step 402 of method 400 includes determining a geographic location of the vehicle. In some examples, the geographic location may be provided by a user. In some examples, the geographic location may be determined from GPS location data and/or geofencing.

Step 406 of method 400 includes determining the maximum speed. In some examples, the maximum speed is determined solely from the load mass of the vehicle. In some examples, the maximum speed is determined from a combination of load mass and geographical location. In some examples, the maximum speed may be provided by the user.

Step 408 of method 400 includes determining if the current vehicle speed is greater than the maximum speed. The current vehicle speed may be measured through the use of a speedometer, GPS data, or other suitable system/method. If the vehicle speed is greater than the maximum speed, the speed control system continues to step 410.

Step 410 of method 400 includes determining if the motor is providing power to the drivetrain. If the motor is providing power to the drivetrain, the speed control system continues to step 412. Otherwise, the speed control system continues to step 414.

Step 412 of method 400 includes reducing the motor power. In some examples, the motor power is reduced by a predetermined increment. In some examples, the motor power is reduced by an amount proportional to a difference between the current speed and the maximum speed.

Step 414 of method 400 includes increasing a brake pressure. In some examples, the brake pressure is increased, for example, utilizing an actuator. In some examples, step 414 includes the use of an antilock brake system (AKA "ABS"). In some examples, step 414 includes the use of electric motor braking (i.e., without the use of mechanical brakes or in addition to the use of mechanical brakes). For example, step 414 may include utilizing regenerative braking, rheostatic braking, reverse current braking, and/or DC injection braking.

C. Illustrative Combinations and Additional Examples

This section describes additional aspects and features of electric assist vehicles having a speed control system, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below may expressly refer to and further limit other paragraphs, providing without limitation examples of some of the suitable combinations.

A0. An electric assist vehicle, comprising:
    a plurality of ground-contacting wheels rotatably coupled to a frame, wherein the frame includes a cargo area;
    a drivetrain operatively coupled to at least one of the ground-contacting wheels and configured to propel the vehicle, wherein the drivetrain is convertible between a human-powered mode and an electric assist mode;
    a sensor configured to determine a characteristic corresponding to a weight of the vehicle; and
    an electronic controller configured to maintain the vehicle below a maximum speed, wherein the maximum speed based on the characteristic.

A1. The electric assist vehicle of paragraph A0, wherein the weight is a gross weight of the electric assist vehicle.

A2. The electric assist vehicle of paragraph A0 or A1, wherein the weight is a gross weight of the cargo area.

A3. The electric assist vehicle of any one of paragraphs A0 through A2, wherein the plurality of ground-contacting wheels includes two rear wheels.

A4. The electric assist vehicle of paragraph A3, wherein the cargo area is disposed between the two rear wheels.

A5. The electric assist vehicle of any one of paragraphs A0 through A4, further comprising a GPS unit;
    wherein the maximum speed is, at least in part, based on a geographic location of the vehicle as determined by the GPS unit.

A6. The electric assist vehicle of any one of paragraphs A0 through A5, further comprising a suspension system.

A7. The electric vehicle of paragraph A6, wherein the characteristic corresponding to the weight of the vehicle is a compression level of the suspension system.

A8. The electric vehicle of paragraph A6, wherein the suspension system is a pneumatic suspension system; and
    wherein the characteristic corresponding to the weight of the vehicle is an air pressure of the suspension system.

B0. A method of operating an electric assist vehicle, the method comprising:
receiving, at a controller of an electric assist vehicle, a mass-related characteristic of the vehicle, wherein the vehicle includes: a plurality of ground-contacting wheels rotatably coupled to a frame, wherein the frame includes a cargo area, and a drivetrain operatively coupled to at least one of the ground-contacting wheels and configured to propel the vehicle, wherein the drivetrain is convertible between a human-powered mode and an electric assist mode;
automatically determining a maximum speed based on the mass-related characteristic of the electric vehicle; and
using the controller, automatically limiting a current speed of the vehicle to no more than the maximum speed.

B1. The method of paragraph B0, wherein limiting the current speed of the vehicle includes automatically decreasing a power output of an electric motor of the electric assist vehicle.

B2. The method of paragraph B0 or B1, wherein, in response to the power output of the electric motor being zero, controlling the current speed of the vehicle includes automatically applying a braking force to the electric assist vehicle.

B3. The method of any one of paragraphs B0 through B2, wherein the mass-related characteristic corresponds to a gross weight of the electric assist vehicle.

B4. The method of any one of paragraphs B0 through B3, wherein determining a maximum speed includes determining a current geographic location of the vehicle based on GPS data.

B5. The method of any one of paragraphs B0 through B4, wherein the plurality of ground-contacting wheels includes two rear wheels.

B6. The method of paragraph B5, wherein the cargo area is disposed between the two rear wheels.

B7. The method of any one of paragraphs B0 through B6, wherein the mass-related characteristic corresponds to a gross weight of the cargo area.

B8. The method of any one of paragraphs B0 through B7, wherein determining the mass-related characteristic of the electric vehicle includes measuring a characteristic of a suspension system of the electric vehicle.

B9. The method of paragraph B8, wherein the characteristic of the suspension system corresponds to a compression of the suspension system.

B10. The method of paragraph B8, wherein the characteristic of the suspension system is an air pressure of the suspension system.

C0. An electric assist vehicle, comprising:
a plurality of ground-contacting wheels rotatably coupled to a frame;
a drivetrain operatively coupled to at least one of the ground-contacting wheels and configured to propel the vehicle, wherein the drivetrain is convertible between a human-powered mode and an electric assist mode;
a sensor configured to determine a characteristic corresponding to a weight of the vehicle; and
an electronic controller configured to maintain the vehicle below a maximum speed, wherein the maximum speed is based on the characteristic.

C1. The electric assist vehicle of paragraph C0, further including a throttle in electronic communication with the electronic speed controller.

C2. The electric assist vehicle of paragraph C0 or C1, wherein the frame includes a cargo area.

C3. The electric assist vehicle of any one of paragraphs C0 through C2, wherein the plurality of ground-contacting wheels includes two rear wheels.

C4. The electric assist vehicle of paragraph C3, wherein the frame includes a cargo area disposed between the two rear wheels.

C5. The electric assist vehicle of any one of paragraphs C0 through C4, further comprising a GPS unit;
wherein the maximum speed is, at least in part, based on a geographic location of the vehicle as determined by the GPS unit.

C6. The electric assist vehicle of any one of paragraphs C0 through C5, further comprising a suspension system.

C7. The electric vehicle of paragraph C6, wherein the characteristic corresponding to the weight of the vehicle is a compression level of the suspension system.

C8. The electric vehicle of paragraph C6, wherein the suspension system is a pneumatic suspension system; and
wherein the characteristic corresponding to the weight of the vehicle is an air pressure of the suspension system.

D0. A method of operating an electric assist vehicle, the method comprising:
receiving, at a controller of an electric assist vehicle, a mass-related characteristic of the vehicle, wherein the vehicle includes: a plurality of ground-contacting wheels rotatably coupled to a frame and a drivetrain operatively coupled to at least one of the ground-contacting wheels and configured to propel the vehicle, wherein the drivetrain is convertible between a human-powered mode and an electric assist mode;
automatically determining a maximum speed based on the mass-related characteristic of the electric vehicle; and
using the controller, automatically limiting a current speed of the vehicle to no more than the maximum speed.

D1. The method of paragraph D0, wherein limiting the current speed of the vehicle includes automatically decreasing a power output of an electric motor of the electric assist vehicle.

D2. The method of paragraph D1, wherein, in response to the power output of the electric motor being zero, controlling the current speed of the vehicle includes automatically applying a braking force to the electric assist vehicle.

D3. The method of any one of paragraphs D0 through D2, wherein the mass-related characteristic corresponds to a gross weight of the electric assist vehicle.

D4. The method of any one of paragraphs D0 through D3, wherein determining a maximum speed includes determining a current geographic location of the vehicle based on GPS data.

D5. The method of any one of paragraphs D0 through D4, wherein the plurality of ground-contacting wheels includes two rear wheels.

D6. The method of paragraph D5, wherein a cargo area is disposed between the two rear wheels.

D7. The method of paragraph D6, wherein the mass-related characteristic corresponds to a gross weight of the cargo area.

D8. The method of any one of paragraphs D0 through D7, wherein determining the mass-related characteristic of the electric vehicle includes measuring a characteristic of a suspension system of the electric vehicle.

D9. The method of paragraph D8, wherein the characteristic of the suspension system corresponds to a compression of the suspension system.

D10. The method of paragraph D8, wherein the characteristic of the suspension system is an air pressure of the suspension system.

Advantages, Features, and Benefits

The different embodiments and examples described herein provide several advantages over known solutions for limiting the maximum speed of electric assist vehicles. For example, illustrative embodiments and examples described herein allow for a maximum speed to be automatically determined based on a weight of the vehicle.

Additionally, and among other benefits, illustrative embodiments and examples described herein allow a maximum vehicle speed to be automatically determined based on a geographic location of the vehicle.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An electric assist vehicle, comprising:
a plurality of ground-contacting wheels rotatably coupled to a frame;
a drivetrain operatively coupled to at least one of the ground-contacting wheels and configured to propel the vehicle, wherein the drivetrain is convertible between a human-powered mode and an electric assist mode;
a sensor configured to determine a characteristic corresponding to a weight of the vehicle; and
an electronic controller configured to maintain the vehicle below a maximum speed, wherein the maximum speed is based on the characteristic.

2. The electric assist vehicle of claim 1, further including a throttle in electronic communication with the electronic speed controller.

3. The electric assist vehicle of claim 1, wherein the frame includes a cargo area.

4. The electric assist vehicle of claim 1, wherein the plurality of ground-contacting wheels includes two rear wheels.

5. The electric assist vehicle of claim 4, wherein the frame includes a cargo area disposed between the two rear wheels.

6. The electric assist vehicle of claim 1, further comprising a GPS unit;
wherein the maximum speed is, at least in part, based on a geographic location of the vehicle as determined by the GPS unit.

7. The electric assist vehicle of claim 1, further comprising a suspension system.

8. The electric vehicle of claim 7, wherein the characteristic corresponding to the weight of the vehicle is a compression level of the suspension system.

9. The electric vehicle of claim 7, wherein the suspension system is a pneumatic suspension system; and
wherein the characteristic corresponding to the weight of the vehicle is an air pressure of the suspension system.

10. A method of operating an electric assist vehicle, the method comprising:
receiving, at a controller of an electric assist vehicle, a mass-related characteristic of the vehicle, wherein the vehicle includes: a plurality of ground-contacting wheels rotatably coupled to a frame and a drivetrain operatively coupled to at least one of the ground-contacting wheels and configured to propel the vehicle, wherein the drivetrain is convertible between a human-powered mode and an electric assist mode;
automatically determining a maximum speed based on the mass-related characteristic of the electric vehicle; and
using the controller, automatically limiting a current speed of the vehicle to no more than the maximum speed.

11. The method of claim 10, wherein limiting the current speed of the vehicle includes automatically decreasing a power output of an electric motor of the electric assist vehicle.

12. The method of claim 11, wherein, in response to the power output of the electric motor being zero, controlling the current speed of the vehicle includes automatically applying a braking force to the electric assist vehicle.

13. The method of claim 10, wherein the mass-related characteristic corresponds to a gross weight of the electric assist vehicle.

14. The method of claim 10, wherein determining a maximum speed includes determining a current geographic location of the vehicle based on GPS data.

15. The method of claim 10, wherein the plurality of ground-contacting wheels includes two rear wheels.

16. The method of claim 15, wherein a cargo area is disposed between the two rear wheels.

17. The method of claim 16, wherein the mass-related characteristic corresponds to a gross weight of the cargo area.

18. The method of claim 10, wherein determining the mass-related characteristic of the electric vehicle includes measuring a characteristic of a suspension system of the electric vehicle.

19. The method of claim 18, wherein the characteristic of the suspension system corresponds to a compression of the suspension system.

20. The method of claim 18, wherein the characteristic of the suspension system is an air pressure of the suspension system.

* * * * *